(12) United States Patent
Gancet et al.

(10) Patent No.: US 6,818,700 B1
(45) Date of Patent: Nov. 16, 2004

(54) DETERGENT BIODEGRADABLE POLYACRYLATES

(75) Inventors: Christian Gancet, Lons (FR);
Rosangela Pirri, Montardon (FR);
Bernard Boutevin, Montpellier (FR);
Bernard Guyot, Brie-Comte-Robert (FR); Jean Lepetit, Allauch (FR)

(73) Assignee: Atofina, Puteaux (FR)

( * ) Notice: Subject to any disclaimer, the term of this patent is extended or adjusted under 35 U.S.C. 154(b) by 147 days.

(21) Appl. No.: 10/049,377

(22) PCT Filed: Aug. 7, 2000

(86) PCT No.: PCT/FR00/02265

§ 371 (c)(1),
(2), (4) Date: Jun. 25, 2002

(87) PCT Pub. No.: WO01/12683

PCT Pub. Date: Feb. 22, 2001

(30) Foreign Application Priority Data

Aug. 12, 1999 (FR) .............................. 99 10433

(51) Int. Cl.$^7$ .............................. C08F 20/02; C11D 3/37

(52) U.S. Cl. .................. 525/10; 510/434; 510/475; 510/476; 510/477; 510/488; 510/533

(58) Field of Search .................. 510/434, 475, 510/476, 477, 488, 533; 525/10

(56) References Cited

FOREIGN PATENT DOCUMENTS

| EP | 0250896 | 1/1988 | |
|---|---|---|---|
| EP | WO 99/62971 | * 12/1999 | ......... C08F/220/04 |
| WO | 9855576 | 12/1998 | |

OTHER PUBLICATIONS

Swift, "Water–Soluble Polymers", Polymer Degradation and Stability 45, pp. 215–231, 1994 (no month given).*

* cited by examiner

Primary Examiner—Brian P Mruk
(74) Attorney, Agent, or Firm—Millen, White, Zelano, Branigan, P.C.

(57) ABSTRACT

Novel biodegradable polymers consisting of a biodegradable core bound to at least two carboxylic polyacid-based branches via a bond capable of being broken by hydrolysis or by oxidation are described. Biodegradable detergent compositions containing such polymers are also described.

11 Claims, No Drawings

DETERGENT BIODEGRADABLE POLYACRYLATES

The invention relates to the field of detergency and in particular to biodegradable detergent compositions. It discloses more particularly biodegradable polymers comprising polyacrylate-based branches.

Generally, detergent compositions involve a number of chemicals. These must be biodegradable in order not to be harmful to the environment. Conventionally, detergent compositions and cleaning agents include phosphates. The latter are very efficient and relatively nontoxic; however, they lead to the eutrophication of natural aquatic environments.

Phosphates have been partially replaced in formulations for detergency by polymers, such as poly(acrylic acid)s or copolymers based on acrylic acid and on maleic anhydride.

Although the polyacrylates currently used do not present this problem, their absence of rapid biodegradability leads to an accumulation in the natural environment (Swift, Polymer Degradation and Stability, 45, 215–231, 1994).

Toxicity associated a priori with these polymers is not known but their long-term effect is uncertain and this uncertainty has contributed to the initiation of numerous research studies intended to improve their biodegradability.

It is clearly established that hydrophilic polymers, such as poly(vinyl alcohol), are rapidly degraded by microorganisms (Macromol. Chem. Phys., 196, 3437, 1995). It is also known that poly(acrylic acid)s with a weight-average mass of less than 1 000 exhibit better biodegradability than their higher homologs (Swift, Ecological Assessment of Polymer, 15, 291–306, 1997).

EP 0 497 611 discloses the preparation of biodegradable terpolymers and of the compositions comprising them. These terpolymers are based on vinyl acetate, acrylic acid and maleic anhydride. They exhibit weight-average masses of less than 20 000.

U.S. Pat. No. 5,318,719 discloses a novel class of biodegradable materials based on the grafting of polymers comprising acid functional groups to a polyoxyalkylene-based biodegradable support.

Other studies indicate that chains comprising heteroatoms are more easily degraded than carbonaceous chains. Thus, U.S. Pat. No. 4,923,941 discloses biodegradable copolymers comprising carboxylic acid functional groups and heterocycles, and the detergent compositions comprising them.

The Applicant Company has now found an effective solution for the preparation of biodegradable polymers for detergency.

These biodegradable polymers, constituting one of the subject matters of the invention, are composed of hydrophilic acrylic polymers carrying carboxyl functional groups, the structure of which is characterized by a biodegradable core (A) to which are attached at least two polycarboxylic chains (B) via bonds (C) degradable by hydrolysis or by oxidative cleavage. These polymers are also characterized in that each polycarboxylic chain has a degree of polymerization which confers good biodegradability on it and which confers, on the combination, good functional properties with respect to the detergent composition.

These structures thus play their role of builder throughout a detergency cycle but, because of the high pH of the detergent medium, gradually undergo alkaline hydrolysis of their hydrolyzable functional groups (C), which releases the acrylic polymers (B). The optionally unhydrolyzed residual part will undergo, in a second step, enzymatic hydrolysis by bacterial proteases or esterases active in the natural environment. Finally, only the core, which is readily biodegradable, and the polymers (B), the low molecular mass of which will allow rapid degradability, will remain.

The polymers of the invention correspond to the following general structure:

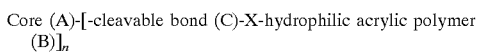

Core (A)-[-cleavable bond (C)-X-hydrophilic acrylic polymer (B)]$_n$ in which n is an integer between 2 and 10 and X is a bivalent atom, such as sulfur.

The core A according to the invention is generally a branched biodegradable molecule or a biodegradable molecule which can give rise to at least two branchings chosen from the group comprising pentaerythritol, trimethylolpropane and ethylene glycol. The polymer B is either a poly (acrylic acid) or a polymer comprising acrylic acid and at least one monomer chosen from the group comprising: unsaturated carboxylic monomers other than acrylic acid, maleic anhydride, vinyl or acrylic monomers, or diene monomers, such as isoprene or butadiene.

B generally has a weight-average mass of between 100 and 2 000.

The functional group C bonding the polymer B to the biodegradable core is a labile bond hydrolyzable by the alkaline or enzymatic route, such as an ester, amide, thioester or thioamide bond, or cleavable by chemical or biological oxidation, such as a double or triple bond.

The biodegradable polymers of the invention can be prepared in various ways. They are advantageously prepared in the following way:

In a first step, the B-X block is prepared, taking care to terminate it with a reactive functional group, by radical polymerization of the monomer(s) in the presence of a reactive transfer agent, in this instance a mercaptan. Subsequently, the functionalized block is reacted with the core A. The respective amounts of A and B are defined so as to have the number of desired branches.

Another alternative form of synthesis consists, in a first step, in modifying the core, so as to prepare:

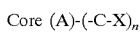

Core (A)-(-C-X)$_n$ and subsequently in polymerizing the monomer(s), so as to directly form the polymer B on the biodegradable core.

The examples described later fully illustrate the method of preparation of the biodegradable polymers of the invention.

The biodegradability of the polymers prepared is evaluated in the following way:

Evaluation of the Degradability and the Properties of the Polymers

The level of degradation obtained is evaluated by liquid chromatography under the following conditions:
Column: TSK 3000 Tosohaas

| Eluent | : | 0.1M H$_3$CCOONa |
| --- | --- | --- |
| Flow rate | : | 0.5 ml/min |
| Injection | : | 25 µl after filtration at 0.22µ |
| Detection | : | Differential refractometer |
| Data acquisition | : | Peaknet Dionex |

Calibration of the column is carried out by virtue of polyacrylate standards (Polymer Laboratories).

The degradability of the polymer under the conditions of the test is measured by the shift in the peak observed by liquid chromatography toward lower molecular masses.

This shift is quantified through a degradability index $I_{1000}$ defined in the following way:

| | |
|---|---|
| Initial mass of the polymer | $M_i$ |
| Final mass of the polymer | $M_f$ |
| Numbers of cleavages | $n_c = \dfrac{M_i}{M_f} - 1$ |
| Initial degree of polymerization | $d_p = \dfrac{M_i}{M_{mono}}$ |
| with $M_{mono}$ | mass of the "average" monomer |
| Degradability index | $I_{1000} = \dfrac{n_c}{d_p} \times 1000$ | i.e.:

$$I_{1000} = \left(\frac{M_i}{M_f} - 1\right) \times \frac{M_{mono}}{M_i} \times 1000$$

1—Alkaline Degradation

The sample of polymer is dissolved in a 0.08M borate buffer, pH 12, in a proportion of 10 mg of polymer per 10 ml of buffer solution. Each trial is subsequently stirred magnetically for a predetermined time in a bath thermostatically controlled at the desired temperature.

Analysis is carried out by liquid chromatography (see above) directly on a withdrawn sample of the reaction mixture after neutralization with 0.1M HCl, in a proportion of 1 ml of HCl per 1 ml of withdrawn sample.

2—Microbiological Degradation

Respiration Test: Warburg Method

The respiration of *C. tropicalis* on a polyacrylate is evaluated in Warburg flasks (total capacity 3 ml) comprising 1.3 ml of 0.1M phosphate buffer, pH 6, 1 ml of yeast suspension (approximately 3 mg dry weight) and 0.5 ml of 1.12 g.l$^{-1}$ polyacrylate (final concentration of 200 ppm).

Control tests are carried out in parallel:
- a flask comprising only phosphate buffer (2.8 ml) makes it possible to measure the variations in atmospheric pressure,
- the endogenous respiration is measured in a flask comprising only phosphate buffer (1.8 ml) and the yeast suspension (1 ml),
- the respiration due to contaminants possibly present in the acrylate solution is also evaluated by a test comprising the acrylate (0.5 ml) and the phosphate buffer (2.3 ml),
- the flasks are agitated in a water bath at 30° C.,
- the measurements of variation in pressure due to the appearance of $CO_2$, which reveals metabolism of the acrylate by the yeast, are made every 15 minutes.

Assimilation Test: Cultures of Complex Flora on Polyacrylate

These cultures are employed on a conventional mineral medium ($MgSO_4.7H_2O$ 3 g; $CaCl_2.2H_2O$ 0.1 g; NaCl 1 g; $FeSO_4.7H_2O$ 0.1 g; $ZnSO_4.7H_2O$ 0.1 g; $CoCl_2$ 0.1 g; $CuSO_4.5H_2O$ 10 mg; $AlK(SO_4)_2.12H_2O$ 10 mg; $H_3BO_3$ 10 mg; $Na_2MoO^4.2H_2O$ 2 mg; q.s. for 1 liter of distilled water) in combination with 0.1M phosphate buffer, pH 7, in the proportions 2/98. The polyacrylate tested is at a final concentration of 500 ppm.

The treatment plant sludges are diluted to a third in 0.1M phosphate buffer, pH 7, with 100 mg.l$^{-1}$ of sample of polyacrylate to be tested, and then the culture is subcultured on a medium comprising 500 mg.l$^{-1}$ of polyacrylate to be tested. The flasks are incubated at 30° C. in Monod tubes with transverse agitation and are subcultured after one week. The culturings are then continued for 30 days under the same conditions. Treatment plant at Trets, Var, France.

3—Evaluation of the Ability to Complex Calcium

The principle of this test consists in measuring the ability of a given polymer to prevent the formation of a $CaSO_4$ precipitate from sodium sulfate and calcium chloride.

The following examples illustrate the invention without limiting it.

EXAMPLES

1—Synthesis of the Polytelomers in the Solvent Phase 50 ml of THF (tetrahydrofuran), acrylic acid, a multifunctional transfer agent and AIBN (azobisiso-butyronitrile) are introduced into a 100 ml two-necked round-bottomed flask equipped with a reflux condenser and a nitrogen inlet.

The reaction mixture is degassed by a succession of vacuum and nitrogen cycles and then placed in an oil bath thermostatically controlled at 70° C. The polymerization takes place under batchwise conditions at reflux of the solvent (THF). After reacting for 12 hours, the reaction mixtures are concentrated on a rotary evaporator and then the residues are precipitated from ethyl ether, filtered off (sintered glass filter No. 5) and dried in an oven under vacuum (5×10$^{-2}$ bar) for a minimum of 6 hours.

The natures and the amounts of the reactants are specified in the table below:

| Reference | Amount acrylic ac., g | Transfer agent | Amount transfer agent, g | Amount AIBN, g | $M_n$ |
|---|---|---|---|---|---|
| BG104 | 11.52 | 4 RSH | 2.44 | 0.27 | 2 876 |
| BG106 | 5.76 | 4 RSH | 2.44 | 0.13 | 1 459 |
| CL17 | 5 | 2 RSH | 0.46 | 0.11 | 1 841 |
| CL19 | 5 | 4 RSH | 1.08 | 0.12 | 2 187 |
| CL35 | 5 | 3 RSH | 1.03 | 0.23 | 1 733 |

4RSH=PETTMP=pentaerythritol tetrakis(3-mercaptopropionate)
3RSH=TMPTMA=trimethylolpropane tris(2-mercapto-15-acetate)
2RSH=EGBTG=ethylene glycol bismercaptoacetate The structures obtained are as follows:

| Reference | Number of branches | Structure | n |
|---|---|---|---|
| BG104 | 4 | 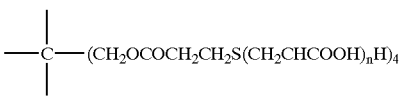 | 8 |

-continued

| Reference | Number of branches | Structure | n |
|---|---|---|---|
| BG106 | 4 | —C—(CH$_2$OCOCH$_2$CH$_2$S(CH$_2$CHCOOH)$_n$H)$_4$ | 4 |
| CL19 | 4 | —C—(CH$_2$OCOCH$_2$CH$_2$S(CH$_2$CHCOOH)$_n$H)$_4$ | 5 |
| CL17 | 2 | —(CH$_2$OCOCH$_2$S(CH$_2$CHCOOH)$_{20}$)$_2$ | — |
| CL35 | 3 | CH$_2$CH$_3$ \| —C—(CH$_2$OCOCH$_2$S(CH$_2$CHCOOH)$_{10}$)$_3$ | — |

BG104, BG106 and CL19 are constructed on pentaerythritol tetramercaptopropionate.

CL17 is constructed on glycol dimercaptoacetate.

CL35 is constructed on trimethylolpropane trimercaptoacetate.

2—Alkaline Degradation of the Polymers

Alkaline hydrolysis: pH 12, 40° C.

| Sample | $M_i$ (at t = 0) | $M_f$ (at t = 120 min) |
|---|---|---|
| BG 104 | 3 180 | 1 400 |
| CL17 | 1 850 | 1 600 |
| CL19 | 1 980 | 1 350 |
| CL35 | 1 570 | 1 350 |

Alkaline hydrolysis: pH 12, 60° C.

| Sample | $M_i$ (at t = 0) | $M_f$ (at t = 180 min) |
|---|---|---|
| BG 104 | 3 180 | 1 300 |
| CL17 | 1 850 | 1 500 |
| CL19 | 1 980 | 1 300 |
| CL35 | 1 570 | 1 360 |

These results indicate that there is clearly a decrease in the molecular mass under the effect of alkaline hydrolysis, in particular for the polytelomer BG104.

3—Microbiological Degradation

The polytelomer BG104 was evaluated by microbiological degradation under the conditions described above. Two types of results were obtained:

a—Respiration Test (Warburg Method)

The polytelomer BG104 was furthermore used as carbonaceous substrate for cultures of *Candida tropicalis* in comparison with easily metabolized control glucose and with a reference polyacrylate.

The respiration values are as follows:

| Substrate | Nature | Respiration $\mu$l O$_2$/h.mg of cells |
|---|---|---|
| Glucose | — | 17.3 |
| BG104 | see above | 3.1 |
| Norasol 4500 | acrylic ac. Homopolymer | 0 |

In comparison with a standard polyacrylate, which does not result in any respiration, the polytelomer BG104 exhibits a specific respiration rate approximately 18% that of glucose, which indicates a marked increase in the biodegradability.

B—Assimilation Test

The polytelomer BG104 was used as carbonaceous substrate for cultures of microorganisms resulting from treatment plant sludges and was analyzed by comparative liquid chromatography after culturing for 15 days.

Analysis of the results indicates that 27% of the polytelomer was degraded by the complex flora present in the culture medium. Washing the biomass with a suitable saline solution did not reveal any trace of polymer, evidence that there has indeed been degradation and not simple adsorption of the polymer.

4—Ability to Complex Calcium

Two aqueous solutions are prepared from distilled water to comprise the following salts:

Solution A: CaCl$_2$.2H$_2$O 64.9 g/l+MgCl$_2$ 0.5 g/l

Solution B: Na$_2$SO$_4$ 62.7 g/l 400 ml of distilled water are introduced into a 500 ml flask, followed by the gradual addition of 50 ml of solution A, with stirring, and subsequently by the addition of 50 ml of solution B. Nothing more is added to a flask acting as control, whereas a certain amount of antitartar agent is added to the other flasks. At time t=0, after homogenization of the solutions, a few ml of solution are withdrawn and the calcium and the magnesium therein are quantitatively determined. The flasks are stoppered and then left standing for 7 days. A few ml of supernatant liquor are then withdrawn and the calcium and the magnesium are again quantitatively determined.

The concentration of the ions is measured by emission spectrometry with the help of the ICP (Inductively Coupled Plasma) technique.

Table of results:

| Ref. | ppm | Content of $Ca^{2+}$ in ppm at t = 0 | Content of $Ca^{2+}$ in ppm at t = 7 days |
|---|---|---|---|
| BG104 | 0.1 | 1 650 | 1050 |
| | 0.2 | 1 620 | 1560 |
| | 0.4 | 1 600 | 1610 |
| BG106 | 0.1 | 1 680 | 990 |
| | 0.2 | 1 650 | 1290 |
| | 0.4 | 1 640 | 1610 |
| CL17 | 0.1 | 1 550 | 1450 |
| | 0.2 | 1 600 | 1650 |
| | 0.4 | 1 650 | 1700 |
| CL19 | 0.1 | 1 500 | 1400 |
| | 0.2 | 1 600 | 1650 |
| | 0.4 | 1 600 | 1650 |
| CL35 | 0.1 | 1 700 | 1350 |
| | 0.2 | 1 650 | 1650 |
| | 0.4 | 1 600 | 1650 |
| Norasol 4500 | 0.1 | 1 660 | 960 |
| | 0.2 | 1 640 | 1450 |
| | 0.4 | 1 670 | 1630 |
| Control | | 1 660 | 900 |

Interpretation:

At 0.1 ppm of polyacrylate, all the compounds are better than the reference compound, with the following classification:

Norasol 4500<BG106<BG104<CL35<CL19<CL17

At 0.2 ppm of polyacrylate, all the compounds except BG106 are better than the reference compound, with the following classification:

BG106<Norasol 4500<BG104<CL35=CL19=CL17

At 0.4 ppm of polyacrylate, all the compounds, including the reference compound, completely inhibit the formation of $CaSO_4$, except BG106, with the following classification:

BG106<Norasol 4500=BG104=CL35=CL19=CL17

What is claimed is:

1. A hydrophilic polycarboxylic polymer with improved degradability of the following general structure:

CORE (A)-[-LABILE BOND(C)-X-POLYCARBOXYLIC CHAIN (B)]$_n$ wherein CORE (A) is a biodegradable core selected from the group, consisting of residues of pentaerythritol tetramercaptopropionate, trimethylpropane trimercagtoacetate, and ethylene glycol dimercartoacetate with the mercaptopropionate or mercantoacetate groups removed, to which are attached polycarboxylic chains (B) via a group (C) having a labile bond which is degradable by alkaline or enzymatic hydrolysis or by oxidative cleavage, X is a bivalent atom, and n is a number from 2 to 10.

2. The hydrophilic polymer as claimed in claim 1, wherein the polycarboxylic chains are acrylic acid homopolymers with a degree of polymerization of less than or equal to 20.

3. The hydrophilic polymer as claimed in claim 1, wherein the polycarboxylic chains are copolymers of acrylic acid and at least one other monomer selected from the group consisting of unsaturated carboxylic monomers, maleic anhydride, vinyl or acrylic monomers, and diene monomers, with a degree of polymerization of less than or equal to 20.

4. The hydrophilic polymer as claimed in claim 1, wherein the connection (X) between the molecule comprising a labile bond and the polycarboxylic chain is composed of a sulfur atom.

5. The hydrophilic polymer as claimed in claim 1, wherein the labile bond degradable by alkaline or enzymatic hydrolysis is an ester, amide, thioester or thioamide bond, and the labile bond degradable by oxidative cleavage is a double or triple bond.

6. The hydrophilic polymer as claimed in claim 1, wherein CORE (A) is the residue of pentaerythritol tetramercaptopropionate with the mercantopropionate groups removed.

7. The hydrophilic polymer as claimed in claim 1, wherein CORE (A) is the residue of trimethylolpropane trimercaptoacetate with the mercaptoacetate soups removed.

8. The hydrophilic polymer as claimed in claim 1, wherein CORE (A) is the residue of ethylene glycol dimercaptoacetate with the mercaptoacetate groups removed.

9. The hydrophilic polymer as claimed in claim 1, wherein the polycarboxylic chains each have a weight-average molecular weight of between 100 and 2000.

10. A detergent composition which comprises a hydrophilic polymer as claimed in claim 1 and at least one other detergent composition component.

11. A crosslinked hydrophilic polycarboxylic polymer with improved degradability wherein the hydrophilic polycarboxylic polymer is of the following general structure:

CORE (A)-[-LABILE BOND (C)-X-POLYCARBOXYLIC CHAIN (B)]$_n$ wherein CORE (A) is a biodegradable core selected from the group consisting of residues of pentaerythritol tetramercaptopropionate, trimethylolpropane trimercaptoacetate, and ethylene glycol dimercaptoacetate with the mercaptopropionate or mercaptoacetate groups removed, to which are attached polycarboxylic chains (B) via a group (C) having a labile bond which is degradable by alkaline or enzymatic hydrolysis or by oxidative cleavage, X is a bivalent atom, and n is a number from 2 to 10, which polymer is crosslinked by difunctional agents such that the crosslinked polymer has superabsorbant properties.

* * * * *

UNITED STATES PATENT AND TRADEMARK OFFICE
CERTIFICATE OF CORRECTION

PATENT NO.   : 6,818,700 B1
DATED        : November 16, 2004
INVENTOR(S)  : Bernard Boutevin It is certified that error appears in the above-identified patent and that said Letters Patent is hereby corrected as shown below:

<u>Column 8,</u>
Line 28, reads "soups", should read -- groups --

Signed and Sealed this

Nineteenth Day of April, 2005

JON W. DUDAS
*Director of the United States Patent and Trademark Office*